Jan. 9, 1968  R. D. BECK  3,362,240
MULTISPEED PNEUMATIC CONTROL AND THE LIKE
Filed March 10, 1965
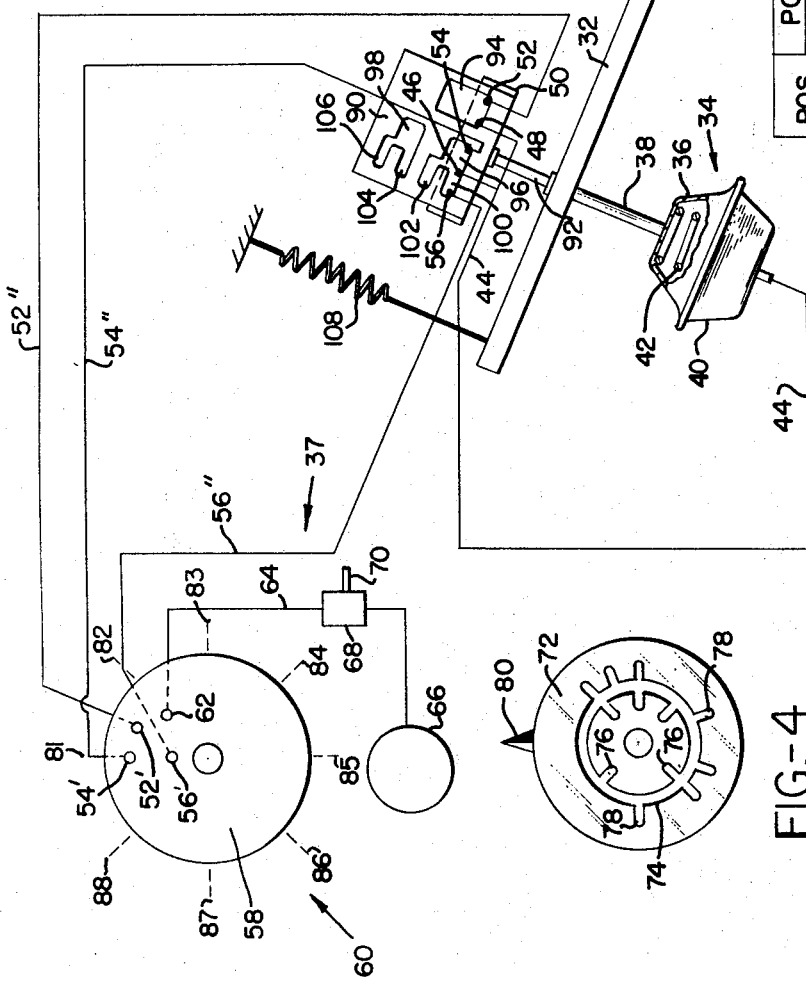

United States Patent Office 3,362,240
Patented Jan. 9, 1968

3,362,240
MULTISPEED PNEUMATIC CONTROL AND THE LIKE
Roland D. Beck, Anaheim, Calif., assignor to Robertshaw Controls Company, Richmond, Va., a corporation of Delaware
Filed Mar. 10, 1965, Ser. No. 438,653
17 Claims. (Cl. 74—230.17)

ABSTRACT OF THE DISCLOSURE

This disclosure relates to a pneumatically operated multiposition actuator means for setting a variable speed transmission means in various operating positions thereof to vary the speed of a driven member in stepped relation thereto, the transmission means being driven by a constant speed drive member and being operatively interconnected to the driven member by a variable pitch pulley means. The pneumatically operated actuator means not only controls the position of the movable sheave relative to the fixed sheave of the variable pitch pulley means, but also varies the position of a valving tape means relative to a reading head to control the pneumatic signal being directed to the actuator means, the flow of pneumatic fluid being remotely controlled by a manually operated selector means.

---

This invention relates to a multispeed pneumatic control, and the like.

According to this invention a device to be controlled as to speed and the like is controlled by a movable member, such as a lever, which lever is moved by a vacuum operated actuator. The vacuum actuator also moves a stepped cavity member over a reading head proportionally to said lever. Such cutoff steps are constructed to cut off openings in said reading head in sequential steps to cut off a vacuum source from said actuator in sequential steps to provide stepped limits of movement of said actuator and/or said lever and the like.

According to a further feature of this invention, a selector valve is provided which may be adjusted to select which one of the openings is to be cut off, to determine a selected limit of travel of said lever and the like.

According to a further feature, a vacuum controlling timer is provided to determine the periods of time during which said actuator is to actuate said lever and the like.

Other features of this invention are apparent from this description, the appended claimed subject matter, and/or the accompanying drawings in which:

FIGURE 1 is a diagrammatic view of the cooperating parts of this invention.

FIGURE 2 is a vertical cross section of the belt transmission taken from the right side of FIGURE 1.

FIGURE 3 is a chart indicating which opening or port in the selector valve is to be connected to the vacuum source or pump.

FIGURE 4 is a view of the channeled face of the selector valve rotatable disc to cooperate with the stationary ported valve disc.

Certain words are used in this specification and claims which indicate direction, relative position, and the like. These words are used for the sake of brevity and clearness of description. However, it is to be understood that such words are used only in connection with the illustrations in the drawings and that in actual use the parts described by such words may have different directions, relative positions and the like. Examples of such words are "upper," "lower," "vertical," "horizontal," etc.

According to this invention, a driven shaft or member 10 may be a drive shaft for any desired driven machine or member, such as an automatic washing machine. For example, the driven shaft or driven member 10 may be rotated in one direction to cause agitation in the automatic washing machine, and may be rotated in the opposite direction to produce a spin action.

The driven shaft 10 may be driven at a controlled variable speed by the motor 12, which motor may be a reversible motor, rotating in one direction by one position of a switch control, not shown, and rotating in the other direction by another position of the switch control.

A variable speed transmission may be provided between the motor 12 and the driven shaft 10. For example, this transmission may be of the V-belt, variable diameter pulley type, which is well known, per se. For this purpose the motor shaft 14 may be provided with a variable diameter motor belt pulley 16 and the driven shaft 10 may be provided with a fixed diameter belt pulley 18.

The pulley 16 may be of the type wherein two pulley flanges 20 and 22 may have inner slanting surfaces to accept a V belt 24 at various effective diameters of the pulley 16. This is a well known construction in which one of the flanges, such as 20, is moved along the axis of the shaft 14 by a compression spring 26, to adjust the effective diameter of the pulley 16. The spring 26 is located around the shaft 14, with one end against the flange 20 and the other end against a nut 27 which is threadedly fixed on the shaft 14. If the pulley flanges 20 and 22 are brought together, to force the belt 24 outward, the motor 12 will drive the shaft 10 at a higher speed, because of the increased diameter of the pulley 16, and vice versa.

For the purpose of automatically varying the diameter of the pulley 16, the motor 12 may be provided with a pivot support member 28, which is pivoted about the fulcrum 30. The pivot support member 28 may be actuated and moved by an actuating lever or control member 32. The lever or control member 32 is thus movable to vary the speed transmission by increasing and decreasing the diameter of the motor belt pulley 16. For example, moving the motor 12 downwardly and the lever 32 upwardly drives the shaft 10 at a slower speed because the diameter of pulley 16 is decreased. Conversely, when the motor 12 is moved upwardly, and the lever 32 is moved downwardly, the effective diameter of the pulley 16 is increased and causes the motor to drive the shaft 10 at a higher speed in a well known manner.

A vacuum controlling coupling 37 for cooperating in controlling the speed, length of time of operation of the motor 12, etc., may be provided. Such coupling 37 may include a selector valve 60, a timer 68 and a vacuum pump 66.

The lever 32 is moved automatically and pneumatically in response to vacuum conditions at the vacuum controlling coupling or arrangement 37. To this end, a vacuum bellows operated actuator 34 may be provided which has a flexible bellows 36 which is subject to movement by the production of a vacuum at the vacuum controlling coupling 37. The bellows 36 longitudinally moves the rod 38, which rod 38 is secured to the lever 32, so that movement of the bellows 36 in response to vacuum conditions at control coupling 37 moves the lever 32 up and down to vary the speed of drive of the shaft 10.

The actuator 34 may have a metal cup 40, within which is a compression spring 42. A vacuum may be produced within the actuator 34 by means of the vacuum or fluid line 44, which vacuum line or tube 44 is connected to the coupling 37 and to stationary vacuum transferring reading head openings 46 and 48 of the reading head 50. These openings 46 and 48 are located in the fixed or stationary reading head 50 which may have other vacuum transferring openings 52, 54 and 56. These reading head openings 52, 54 and 56 are connected respectively with openings or ports 52', 54' and 56' on a stationary ported disc 58 of a selector valve 60, respectively by vacuum or fluid lines 52", 54" and 56". The stationary disc 58 also has a vacuum or suction opening or port 62 which is connected by the line or tube 64 with a source of vacuum 66, which may be a vacuum pump. Interposed between the opening 62 and the vacuum pump 66 is a program member or timer 68 which is connected to the line 64. The timer 68 controls the operation of the vacuum pump and connects the vacuum pump 66 with various vacuum operated actuators, not shown, and also connects the vacuum pump 66 with the line 64 and opening 62 at the proper times as required for one or more washing programs.

The timer 68 determines the lengths of time of periods during which the actuator 34 is to be subjected to a vacuum. The line 64 and vacuum actuator 34 are connected to the vacuum pump 66 during certain periods of time by the timer 68 during the one or more washing programs. After each such period of time, the timer 68 may disconnect the vacuum pump from the line 64 and actuator 34, and/or may connect these to the atmosphere through the line 70, to break the vacuum in the actuator 34 when desired.

To select which one or more of the openings 52, 54 or 56, are to be connected to the source of vacuum 66, a selector rotatable disc 72, FIGURE 4, is rotatable against the stationary disc 58. The rotatable disc 72 has a face, which is now directed toward the viewer, placed against the face of the disc 58. This causes the circular vacuum transferring groove or channel 74 always to be located over the vacuum suction opening 62 of the stationary disc 58. The inward vacuum transferring radial channels 76 will connect with the opening 56' of the stationary disc 58. The outward radial channels 78 will connect with the openings 52' and 54' to connect these openings to the suction or vacuum opening 62 when the disc 72 places the radial channels 76 and/or 78 over the openings 56', 54' or 52', as the case may be.

The rotatable disc 72 may be provided with a pointer 80 which indicates the selected position of the rotatable disc 72.

For example, the pointer 80 is adapted to point to the positions 81 to 88 respectively, variously to connect the openings 52', 54' and 56', with the suction opening 62 and with the source of vacuum 66. The chart shown in FIGURE 3 shows the positions of the pointer 80, with respect to the positions 81–88 in the column marked "POS." The letter X in the chart indicates what ports or openings 52', 54' or 56', are connected with the suction port or opening 62 and the source of vacuum 66 by the vacuum transferring grooves 74, 76 and 78 of the disc 72, when the pointer 80 is at the various positions 81–88.

A flat blister tape or variously channeled member 90 is slidable over the fixed reading head 50. The blister tape or variously channeled member 90 is connected by the rod 92 to the lever 32, so that the blister tape 90 is moved over the reading head in proportion to the movement of the lever 32, and in proportion to the movement of the diaphragm 36. Suitable "blisters" or raised impressions, cavities or channels may be placed or formed on the tape 90. The openings 46, 48, 52, 54 and 56 of the reading head may be placed in a straight row transverse to the movement of the tape 90. These openingse are covered by unblistered portions of the tape 90 so they do not transfer vacuum or fluid. These openings will be uncovered and connected with other uncovered openings by the blistered portions or cavities, as will become evident.

For example, a larger or longer rectangular blister or cavity 94 may be provided. Also, two intermediate sized rectangular blisters and cavities 96 and 98 may be provided, the cavity 96 being a lower intermediate sized cavity and the cavity 98 being an upper intermediate sized cavity. These blisters or cavities 96 and 98 may be connected respectively to the ends of the two parallel small lower rectangular cavities 100 and 102 and to the two parallel small upper cavities 104 and 106. The words "upper" and "lower," as used in connection with the blisters or cavities 94–106, are used in connection with the illustration of the tape 90 in FIGURE 1, but in actual practice may have different relative positions.

The upper stepped edges of the rectangular cavities 94–106, as illustrated in FIGURE 1, form a stepped cavity member in which such upper stepped edges form cut off steps to cut off various ones of the openings 46, 48, 52, 54 and 56 as the cavity member is moved downwardly over the reading head 50.

The tape 90 may be a thin flexible tape of sufficient thickness, so that when blisters or raised substantially rectangular portions 92–106, with corresponding cavities under the blisters, are moved over the openings 46, 48, 52, 54 and 56 in various relative positions, the shaft 10 is caused to be rotated at higher speeds.

The blister tape 90 is moved upwardly or downwardly in a slanting direction over the reading head 50, and as the lever 32 is pulled down as the bellows 36 collapses and pulls the rod 38 downward against the compression load of the spring 42. The movement of the lever 32 causes the diameter of the pulley 12 to be varied so that the speed transmission of the belt 24 is also varied.

In the position shown in FIGURE 1, the openings 48 and 52 are connected to each other by the large cavity 94. The openings 46 and 54 are connected to each other by the intermediate sized rectangular blister 96. The openings 46 and 56 are connected to each other by the small rectangular cavity 100 which has its end connected to cavity 96.

In the position illustrated in FIGURE 1, the actuator 40 is connected by the line 44 to the openings 48 and 54. However, if the selector disc 72 is in position 81, none of the openings 52', 54', or 56', will be connected to the vacuum pump 66, as indicated by the chart of FIGURE 3, so that the bellows 36 cannot be subjected to a vacuum and will not be collapsed, and the lever 32 will remain in its uppermost or slowest speed position, as illustrated. The shaft 10 will then be driven at its slowest or normal speed, as indicated in FIGURE 1.

If the disc 72 and pointer 80 are placed in position 82, then the opening 56' will be connected to the vacuum or suction opening 62, and to the vacuum pump 66, if the timer 68 has connected the line 64 to the vacuum pump 66. This will cause a vacuum to be applied by the vacuum pump 66 to the opening 62, and then to the opening 56' by means of vacuum transferring grooves 74 and 76 and thence through the line 56" to the opening 56. From thence the vacuum will be transferred by the cavity 100 to the opening 46. From thence the vacuum will flow through the line 44 to the vacuum actuator 34, and will create a vacuum within the bellows 36 of the actuator 34. This will collapse the bellows 36 downwardly and start to pull the lever 32 and the blister tape 90 downwardly and will continue to do so, until the upper edge of the small cavity 100 is pulled down over the opening 56. This will cause the unblistered area immediately above the area 100 to cover the opening 56 and this will break the vacuum connection with opening 46 and will prevent any further production of vacuum in the actuator 34, since the vacuum pump 66 is then completely disconnected from actuator 34. Therefore, the actuator 34 will not pull the tape 90, or the lever 32, downward any further than the position just described, since the opening 56 is at that time the only connection with the vacuum pump 66, as long as the disc 72 is in position 82, as is indicated by the chart in FIGURE 3. This will be the first increase in speed of the shaft 10 from the normal or slowest speed of FIGURE 1. Thus the upper edge of the small rectangular cavity 100 forms the first cutoff step.

If the indicator 80 is moved to the position 83, then the opening 54' will be connected to the suction or vacuum opening 62 and by the line 54" with the opening 54 under the cavity 96, in accordance with FIGURE 3. Under these conditions the vacuum will be transmitted by the line 54″ to the opening 54. The opening 54 will be connected by the lower intermediate cavity 96 with the opening 46 and from thence to the line 44 and to the vacuum actuator 34. The vacuum actuator 34 will pull the tape 90 downwardly as long as the intermediate cavity 96 is over the opening 54. However, when the upper edge of the cavity 96 covers the opening 54, the vacuum will be broken and will not be transferred by the cavity 96 to the opening 46, and from thence through the line 44 to the vacuum actuator 34. Hence, the blister tape 90 will stop its downward movement when the unblistered portion of the tape above the upper edge of cavity 96 covers the opening 54. This will cause the vacuum actuator 34 to arrest movement of the rod 32 one step below the conditions of position 82. This will cause the speed of the shaft 10 to be increased to a second value, slightly faster than that of position 82. This will be the second cutoff step.

If the selector 72 is moved with pointer 80 at position 84, then according to FIGURE 3, the openings 56′ and 54′ will be connected to the vacuum opening 62 and vacuum pump 66. The vacuum will be transferred from opening 62 to openings 54′ and 56′ by groove 74 and by a groove 78 and groove 76. The vacuum is then transferred by the lines 54″ and 56″ respectively to the reading head openings 54 and 56. The vacuum will then be transferred to the opening 46 by the cavities 96 and 100. The vacuum will then be transferred from the opening 46 to the line 44 and from thence to the vacuum actuator 34. This will cause the tape 90 to be pulled down by the actuator 34 until the upper edge of the upper small rectangular cavity 102 finally covers the opening 56 after the opening 54 has previously been closed by the upper edge of cavity 96. Hence, the tape 90 will be pulled down until the upper edge of the cavity 102 covers the opening 56 to provide the third step of variation of speed control or the like. That is, this will cause the actuator 34 to pull the lever 32 and tape 90 to the third step of increased speed of shaft 10 and the like.

If the selector disc 72 is moved to position 85, then the opening 52′ will be connected to the vacuum opening 62, according to FIGURE 3, and a vacuum will be transmitted to the line 52″ and from thence to the opening 52 under the larger cavity 94. The vacuum will then be transferred by the cavity 94 to the opening 48 and from thence to the line 44 and the actuator 34, so that the tape 90 will be pulled down unil the upper edge of the cavity 94 covers the opening 52, which will break the transfer of vacuum to the actuator 34 and will cause the lever 32 to be pulled down to a lower position and establish the fourth step of control variation or increased speed of the shaft 10.

If the disc 72 and its pointer 80 are moved to position 86, then the openings 56′ and 52′ will be connected to the suction opening 62 and by the respective lines 56″ and 52″ with the openings 52 and 56 of the reading head 50. This will cause the vacuum to be transferred to openings 46 and 48 and then by line 44 to actuator 34. The opening 56 will be covered by the upper edge of cavity 100 and will be uncovered by the cavity 102 and again covered by the upper edge of the cavity 102. However, in the meantime the cavity 94 continues to connect the openings 48 and 52 as the tape 90 is being pulled down until the upper edge of cavity 94 covers openings 48 and 52. At that time the lower edge of cavity 104 has overlapped the opening 56 and has transferred the vacuum to opening 46 and to actuator 34. The downward movement of the lever 32 therefore continues until the upper edge of cavity 104 finally breaks all vacuum connection to the actuator 34. This establishes the fifth cutoff step of control variation or of speed increase.

The action of the lower edges of the small cavity 104 and intermediate cavity 98 may be below or overlap the action of the upper edge of the long rectangular cavity 94 to insure continuous suction action for such fifth step. In position 87 the openings 52′ and 54′ are connected to vacuum or suction openings 62 and hence produce vacuum through lines 52″ and 54″ in openings 52 and 54. This causes continuous supply of vacuum to actuator 34 from opening 52 by cavity 94 to opening 48 as the tape 90 is pulled down. When the upper edge of cavity 94 closes openings 48 and 52 the lower edge of cavity 98 overlappingly connects openings 46 and 54 so the supply of vacuum to the actuator 34 continues and the lever 32 and tape 90 continue to be pulled down until the upper edge of cavity 98 closes opening 54 and stops all further supply of vacuum to the actuator 34. This establishes the sixth step of control variation, such as the sixth step of speed increase for the shaft 10.

Adjustment of the indicator 80 to position 88 establishes the seventh step of control variation such as the seventh step of speed increase of the shaft 10. According to the chart of FIGURE 3, this adjustment to position 88 connects the vacuum pump to openings 52′, 54′ and 56′, which in a manner previously explained transfers the vacuum to the openings 52, 54 and 56 at the reading head. This transfers the vacuum to the actuator 34 also as previously explained to cause downward movement of the lever 32 and tape 90 until the final break in the vacuum transfer is produced when the upper edge of small rectangular cavity 106 finally closes opening 56 which is the last connection between the vacuum pump 66 and the actuator 34. This establishes the seventh step of variation control or speed increase for the shaft 10.

The timer 68 causes the agitation and spin operations of the washing machine to be performed at selected times and for selected periods of time determined by the timer, which opens the connection between the line 64 and the vacuum pump 66 for the desired lengths of time. The speeds of agitation and/or spin are produced at the speeds manually selected by the position of the pointer 80. The timer 68 may break the vacuum in the actuator 34 after each selected operation by connecting the atmospheric line 70 with the line 64 so that atmospheric air may flow to the actuator 34 through the same path that previously supplied the vacuum to the actuator.

It has thus to be seen that by positioning the selecting disc 72 at the various positions of the chart of FIGURE 3, any desired downward movement of the lever 32 may be produced by the vacuum actuator 34. This in turn provides a stepped control variation such as a variation in the effective diameter of the pulley 16, by causing the belt 24 to be forced outwardly farther along the pulley 16 and thus driving the washing machine shaft 10 faster and faster, as the lever 32 is pulled downward and downward by the selection of positions 81 through 88 of the selector 72.

The timer mechanism 68 will cause the operation of the motor 12 to begin to stop by electrical connections or vacuum connections entirely independent of those shown in these figures to select the length of time of agitation, spin or any other sequence desired.

The timer may have a plurality of variously actuated vacuum openings for energizing various actuators including an actuator or actuators for energizing the motor 12 to rotate it in either direction. Also, the timer may have suitable vacuum and atmospheric openings to connect the line 64 either to vacuum pump 66 or to atmospheric line 70. Such timer construction is well known, per se, and is therefore not further illustrated or described.

If desired, a return tension spring 108 may be provided at the end of the lever 32, which may be in addition to, or as an alternative construction to, the compression spring 42 within the actuator 40.

A new, unobvious and useful control is thus provided.

While the form of the invention now preferred has been disclosed as required by statute, other forms may be used, all coming within the scope of the claimed subject matter which follows.

What is claimed is:

1. In combination: a motor shaft with a variable diameter motor belt pulley; a driven shaft with a fixed diameter belt pulley; a belt connecting said pulleys; a lever having a pivot support for said motor, said lever being movable to increase and decrease the diameter of said motor belt pulley; a vacuum operated actuator having a bellows connected to said lever so that increased vacuum travel of said bellows causes increased diameter of said motor belt pulley and increased speed of said driven shaft; a vacuum reading head having stationary vacuum transferring reading head openings with one or more of said openings being connected to said vacuum actuator; a speed selector valve having a plurality of vacuum transferring selector valve openings, some of said reading head openings being connected to some of said selector valve openings and one valve opening being connected to a source of vacuum; a manually adjustable valve channel selector connector to connect various selector valve openings with various of said reader head openings and with said source of vacuum; and a flexible blister tape movable proportionately to movement of said lever and connecting various ones of said reading head openings to regulate the distance of travel of said lever as selected by said valve channel selector connector.

2. A combination according to claim 1 in which a vacuum controlling timer controls the periods of time of application of vacuum to said vacuum actuator.

3. A combination according to claim 1 in which said steps in said cavity member are produced by stepped edges of cavities in said cavity member.

4. A combination according to claim 3 in which said stepped edges are edges of stepped substantially rectangular cavities in said cavity member.

5. In combination: a driven member; a driving member; a variable speed transmission drivingly connecting said members; a speed control member movable to adjust the variable speed of said transmission; a vacuum bellows operated actuator connected to said speed control member; a speed selector valve having inlet and outlet openings; a reading head with one or more openings connected to said bellows and with outlet openings connected to said inlet openings of said speed selector valve; a stepped cavity member movable over said reading head openings and movable by said actuator, said stepped cavity member having a cavity construction with cutoff steps constructed to cut off various ones of said openings at said steps as said control member is moved by said actuator to provide stepped limits of movement of said control member, said selector valve having manually adjustable means to connect selected ones of said openings of said reading head with a source of vacuum to determine which one of said steps is effective to determine the movement of said control member.

6. In combination: a reading head with a plurality of vacuum transferring openings; means to apply a vacuum to one or more of said openings; a vacuum operated actuator having a movable part; means connecting one or more of other of said openings to said vacuum operated actuator; a stepped cavity member movable over said reading head openings and directly movable by movement of said part of said actuator, said stepped cavity member having a cavity construction with cutoff steps constructed to cut off various ones of said openings as said cavity member is moved over said reading head to provide stepped limits of movement of said cavity member by said actuator.

7. A combination according to claim 6 in which said steps in said cavity member are produced by stepped edges of cavities in said cavity member.

8. A combination according to claim 7 in which said stepped edges are edges of stepped substantially rectangular cavities in said cavity member.

9. A combination according to claim 8 in which said openings are located along a substantially straight line transverse to the movement of said cavity member, and in which said cavities include two parallel small lower rectangular cavities which are joined at their ends by an intermediate sized lower rectangular cavity, the upper edges of said small lower rectangular cavities forming the first and third cutoff steps and the upper edge of said intermediate lower cavity forming the second cutoff step.

10. A combination according to claim 9 in which the upper edge of a longer rectangular cavity is sidewise of said small and intermediate cavities and forms the fourth cutoff step.

11. A combination according to claim 10 in which two parallel small upper rectangular cavities are joined at their ends by an intermediate upper rectangular cavity, the upper edges of said small upper rectangular cavities forming the fifth and seventh cutoff steps and the upper edge of said intermediate upper cavity forming the sixth cutoff step, and with the lower edges of one of said small upper rectangular cavities and of said upper intermediate rectangular cavity overlapping said upper edge of said longer rectangular cavity.

12. A combination according to claim 6 in which said stepped cavity member is a flexible tape with cavity forming blister construction to form said cavity construction.

13. In combination, a driven member, a driving member, a variable speed transmission means drivingly connecting said members, a speed control member movable to various positions to adjust the variable speed of said transmission means and, thus, the speed of said driven member, and a multi-position actuator means for moving said speed control member to various positions in stepped increments of movement from one position to another position in relation to said actuated positions of said actuator means.

14. A combination as set forth in claim 13 wherein said actuator means is pneumatically operated.

15. A combination as set forth in claim 14 and including selector means operatively interconnected to said actuator means for preselecting the position to which said actuator means is to be pneumatically actuated.

16. A combination as set forth in claim 13 wherein said speed control member is pivotally mounted for pivotal movement by said actuator means.

17. A combination as set forth in claim 13 wherein said variable speed transmission means comprises a variable pitch pulley means.

References Cited
UNITED STATES PATENTS

| 2,585,732 | 2/1952 | Braman | 74—230.17 |
| 2,625,835 | 1/1953 | Marek | 74—472 |
| 3,137,178 | 6/1964 | Bruet | 74—230.17 |
| 3,177,898 | 4/1965 | Scott et al. | 91—39 X |
| 3,195,368 | 7/1965 | Boudewijn | 74—230.17 X |
| 3,199,412 | 8/1965 | Palmer | 91—357 |
| 3,216,325 | 11/1965 | Couffer et al. | 91—37 X |
| 3,216,326 | 11/1965 | Rice et al. | 91—37 X |
| 3,233,629 | 2/1966 | Beck | 137—624.18 |

MILTON KAUFMAN, *Primary Examiner.*

DAVID J. WILLIAMOWSKY, FRED C. MATTERN, *Examiners.*

J. A. WONG, *Assistant Examiner.*